G. E. GORDON.
CONSTRUCTION OF SHIPS, &c.
No. 172,113. Patented Jan. 11, 1876.
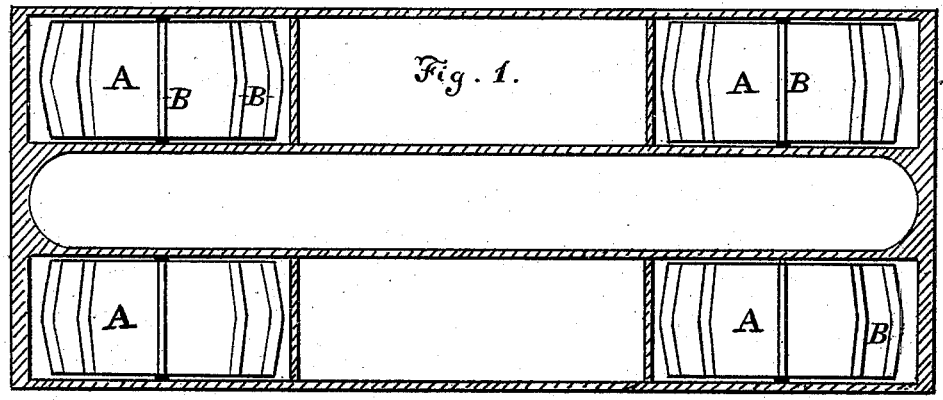
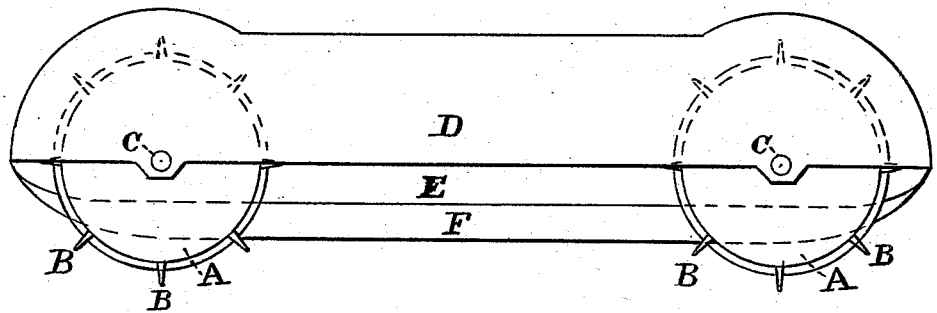
Witnesses:
G. B. Towles.
Theodore Mungen.
Inventor:
George E. Gordon,
by M. H. & W. T. Howard,
Attorneys.

UNITED STATES PATENT OFFICE.

GEORGE E. GORDON, OF DANNEMORA, NEW YORK, ASSIGNOR OF ONE-HALF HIS RIGHT TO WILLIAM P. SLATER, OF WASHINGTON, D. C.

IMPROVEMENT IN THE CONSTRUCTION OF SHIPS, &c.

Specification forming part of Letters Patent No. 172,113, dated January 11, 1876; application filed December 18, 1875.

*To all whom it may concern:*

Be it known that I, GEORGE E. GORDON, of Dannemora, in the county of Clinton and State of New York, have invented certain new and useful Improvements in Boats; and I do hereby declare the following is a full, clear, and exact description of the construction and operation of the same, reference being had to the accompanying drawing forming a part of this specification, in which—

Figure 1 represents a sectional plan, showing the interior of the boat, the upper portion being removed. Fig. 2 is a side view of my invention, showing the inclosing portion of the hull, the keel, and false keel, and attachment of the peripheral paddles, hereinafter referred to.

This invention relates to a boat-hull supported on two driving-shafts, each provided with two circular floats, having paddles traversing their peripheries laterally, the object being to support the hull of the boat above the surface of the water, to avoid the friction heretofore created in forcing the boat through the water, and to increase the speed of the boat, all of which will hereinafter more fully appear.

Similar letters of reference in the accompanying drawing indicate like parts of the invention.

The circular floats A are hollow, water-tight, provided with the peripheral paddles B, and mounted on the driving-shafts C C, which support the hull of the boat. The shafts C C project beyond the outer faces of the circular floats A. Boxes or bearings on each side of the floats A prevent a lateral movement of the same upon the shafts C C. The keel E and false keel F depend from the bottom of the hull D, and extend to nearly the depth of the floats A.

It is intended that the engine and the engine-room shall occupy the lower portion of the hull D, between the pairs of floats A, and that the saloon, state-rooms, &c., shall occupy the upper portion of the hull. The floats A support the hull of the boat above the surface of the water.

The floats A may be, for example, thirty feet in diameter, fifteen feet wide, hollow, and water-tight, fifteen feet between the floats of each, and two feet of shaft projecting on each side of the outer surfaces of each float of a pair, thus making the shafts C C forty-nine feet in length. On this scale the distance between the shafts C C should be seventy feet, and the entire length of the boat one hundred feet. Any desired proportions may be used that will support the hull of the boat above the surface of the water.

Having thus described my invention of improvements, what I claim as new and useful, and desire to secure by Letters Patent, is—

The inclosing-hull D, keel E, and false keel F, combined with the buoyant floats A, provided with peripheral paddles B and driving-shafts C, substantially as herein specified.

GEORGE E. GORDON.

Witnesses:
A. McDONELL,
W. A. FULLER.